(12) United States Patent
Davies et al.

(10) Patent No.: US 6,823,325 B1
(45) Date of Patent: Nov. 23, 2004

(54) METHODS AND APPARATUS FOR STORING AND RETRIEVING KNOWLEDGE

(76) Inventors: Trevor B. Davies, Chalet Schmadri, Mürren (CH), 3825; Mark D. Hanlon, Sheraton House, Castle Park, Cambridge (GB), CB3 0AX; Christopher R. Tromans, Sheraton House, Castle Park, Cambridge (GB), CB3 0AX ( * ) Notice: Subject to any disclaimer, the term of this patent is extended or adjusted under 35 U.S.C. 154(b) by 515 days.

(21) Appl. No.: 09/721,473

(22) Filed: Nov. 22, 2000

Related U.S. Application Data

(60) Provisional application No. 60/167,092, filed on Nov. 23, 1999, now abandoned.

(51) Int. Cl.[7] .................................................. G06N 5/00
(52) U.S. Cl. .......................................... 706/50; 706/61
(58) Field of Search ....................... 706/50, 61; 703/22; 707/4; 715/531

(56) References Cited

U.S. PATENT DOCUMENTS

| | | | | |
|---|---|---|---|---|
| 5,379,366 A | * | 1/1995 | Noyes | 706/55 |
| 5,386,556 A | * | 1/1995 | Hedin et al. | 707/4 |
| 5,712,960 A | * | 1/1998 | Chiopris et al. | 706/61 |
| 6,185,592 B1 | * | 2/2001 | Boguraev et al. | 715/531 |
| 6,609,087 B1 | * | 8/2003 | Miller et al. | 703/22 |

* cited by examiner

*Primary Examiner*—Wilbert L. Starks, Jr.
(74) *Attorney, Agent, or Firm*—Lowrie, Lando & Anastasi, LLP

(57) ABSTRACT

Apparatus for storing and retrieving knowledge includes a natural language parser, a knowledge research agent, and a directional (compass) search agent. Methods for storing and retrieving knowledge can include directional searching which combines a query text with a relationship to search, and automated knowledge model construction based upon contents of an existing knowledge model and external information searches.

22 Claims, 7 Drawing Sheets

METHODS AND APPARATUS FOR STORING AND RETRIEVING KNOWLEDGE

CROSS REFERENCE TO RELATED APPLICATION

This application claims domestic priority under 35 U.S.C. § 119(e) to U.S. Provisional Patent Application Ser. No. 60/167,092, filed Nov. 23, 1999, now abandoned, and incorporated herein in its entirety by reference.

BACKGROUND

1. Field of the Invention

The present invention relates to systems and methods for organizing, storing and retrieving knowledge.

2. Related Art

Presently, a great deal of human knowledge is organized in such information structures as databases, collections of text documents, collections of expert system rules, etc. However, knowledge contained in such structures is difficult to efficiently identify, locate and retrieve when needed.

One known, more efficient, knowledge storage and retrieval system is the Hyperknowledge knowledge base developed by Hyperknowledge Corporation and described by Trevor Davies in U.S. Pat. No. 6,002,396, issued Dec. 14, 1999, referred to hereinafter as Davies, and incorporated herein in its entirety, by reference. In knowledge bases organized under the principles of Davies, referred to hereinafter as linked knowledge models, four useful relationships between elements of the knowledge represented are contained in links between the elements. The relationships are conveniently represented by the points of a compass rose, as shown in FIG. 1, indicating that information "West" of a selected concept elaborates "Why" relative to the selected concept, while information "East" of the selected concept elaborates "How" relative to the selected concept. Further, information "South" of the selected concept elaborates "What" relative to the selected concept, while information "North" of the selected concept elaborates "What is" relative to the selected concept. The directions North, South, West and East are conveniently represented in visual presentations of linked knowledge models by placing information elaborating "What is", "What", "Why" and "How" respectively above, below, to the left of and to the right of the selected concept. As explained by Davies, the relationships indicated by opposing direction pairs, i.e., North-South (What is-What) and East-West (How-Why), are complementary.

SUMMARY OF THE INVENTION

Embodiments of the present invention help a user to find knowledge pertinent to a user, rather than finding unconnected, raw information. Knowledge is used herein to refer to information which has been organized according to context and meaning, while information is used herein to refer to raw information which is unorganized or organized according to other criteria, such as input format, vocabulary used, source, etc.

To find knowledge, embodiments of the present invention receive information as natural language and produce therefrom a linked knowledge model. The linked knowledge model can then be navigated to extract knowledge, according to the relationships "How", "Why", "What" and "What is" discussed above, using a user interface, which visually facilitates making the connections between pieces of information.

Embodiments of the present invention can increase a user's knowledge by augmenting the knowledge base available to the user in the form of a linked knowledge model. Gaps in the linked knowledge model and edges or boundaries of the linked knowledge model are susceptible to automatic detection. Embodiments of the invention can therefore detect such gaps and edges and search for missing information on an ad hoc, regularly scheduled or other basis.

Some embodiments of the invention can include user interfaces which automatically analyze the knowledge sought in inquires, for example received by email, and prepare responses to those inquiries based on the contents of a dynamic linked knowledge model accessible to the user. Moreover, the contents of queries and other received information can be related to the information already contained in the linked knowledge model, to expand the model, automatically. The linked knowledge model can also be presented in various useful formats, depending on the type of knowledge sought.

According to one aspect of the invention, there is a system for storing and retrieving knowledge, comprising a text analyzer having an input which receives information as natural language and which produces at an output annotated information, a parser having an input which receives the annotated information from the text analyzer and which produces and stores in a memory a linked knowledge model thereof, and a user interface presenting at least one pair of complementary relationships to an operator, through which the operator can navigate the linked knowledge model to retrieve knowledge. The system can further comprise a knowledge research agent having an input receiving the linked knowledge model and having an output on which the knowledge research agent produces a query compatible with an external search engine. The Hyperknowledge agent may automatically augment the linked knowledge model with new information found by executing the query on the external search engine. In the system, the parser can further comprise a Rules Engine executing a plurality of rules defining a structure of knowledge embedded in information expressed in natural language. The linked knowledge model may include connected noun/verb phrase pairs, and the plurality of rules may define how sentences in natural language relate to connected noun/verb phrase pairs in the linked knowledge model. The rules may include at least one semantic rule, at least one syntactic rule or at least one context rule.

According to another aspect of the invention, there is a method for retrieving knowledge. The method comprises presenting to an operator a selector by which the operator indicates one of a pair of complementary relationships and a query input by is which the operator indicates query text, and combining the one of the pair of complementary relationships indicated and the query text to form a query by which knowledge is retrieved. According to the method of this aspect of the invention, the selector may further define four directions characterized by complementary pairs of directions, each direction representing a relationship. The selector may further be presented in a graphical form resembling a compass rose. The method may further comprise storing knowledge in a linked knowledge model including noun/verb phrase pairs, searching the linked knowledge model for a first noun/verb phrase pair defined by the query text, and retrieving a second noun/verb phrase pair from the linked knowledge model bearing the indicated one of the pair of complementary relationships to the first noun/verb phrase pair. Finally, searching may further comprise parsing a natural language query text into a searchable Boolean expression.

According to yet another aspect of the invention, there is a method for storing knowledge, comprising parsing a natural language document into a linked knowledge model including connected noun/verb phrase pairs, identifying portions of the linked knowledge model in which a level of knowledge represented is lower relative to other portions of the linked knowledge model, and executing searches of external information for additional knowledge related to the identified portions of the linked knowledge model. According to this method, the identified portions of the linked knowledge model may further include a first noun/verb phrase pair lacking a second noun/verb phrase pair related by at least one of two complementary relationships defined between the noun/verb phrase pairs.

According to other aspects of the invention, each of the foregoing aspects of the invention may be embodied as a software product including a machine readable medium on which is encoded a sequence of software instructions which when executed direct the performance of one of the methods discussed above, or which cause a general purpose computer to act as a special purpose system as defined above.

BRIEF DESCRIPTION OF THE DRAWINGS

In the drawings, in which like reference designations indicate like elements.

DETAILED DESCRIPTION

The present invention will be better understood upon reading the following detailed description of some embodiments and aspects thereof in connection with the drawings.

There are four principle aspects to embodiments of the invention, which are discussed below. A complete architecture embodying the principles of the invention is then discussed. The four aspects are referred to as 1) directional search capability; 2) knowledge extraction from natural language information; 3) automated knowledge research; and 4) interface agents.

Directional Search Capability

Directional search capability, for example using a Compass Search Agent (see FIG. 4, 401), allows a user to specify a knowledge direction in which to execute a specified search. Thus, a search produces more focussed answers to a user's query. Using the data structures and visual presentations according to Davies facilitate this capability.

Figure 2:
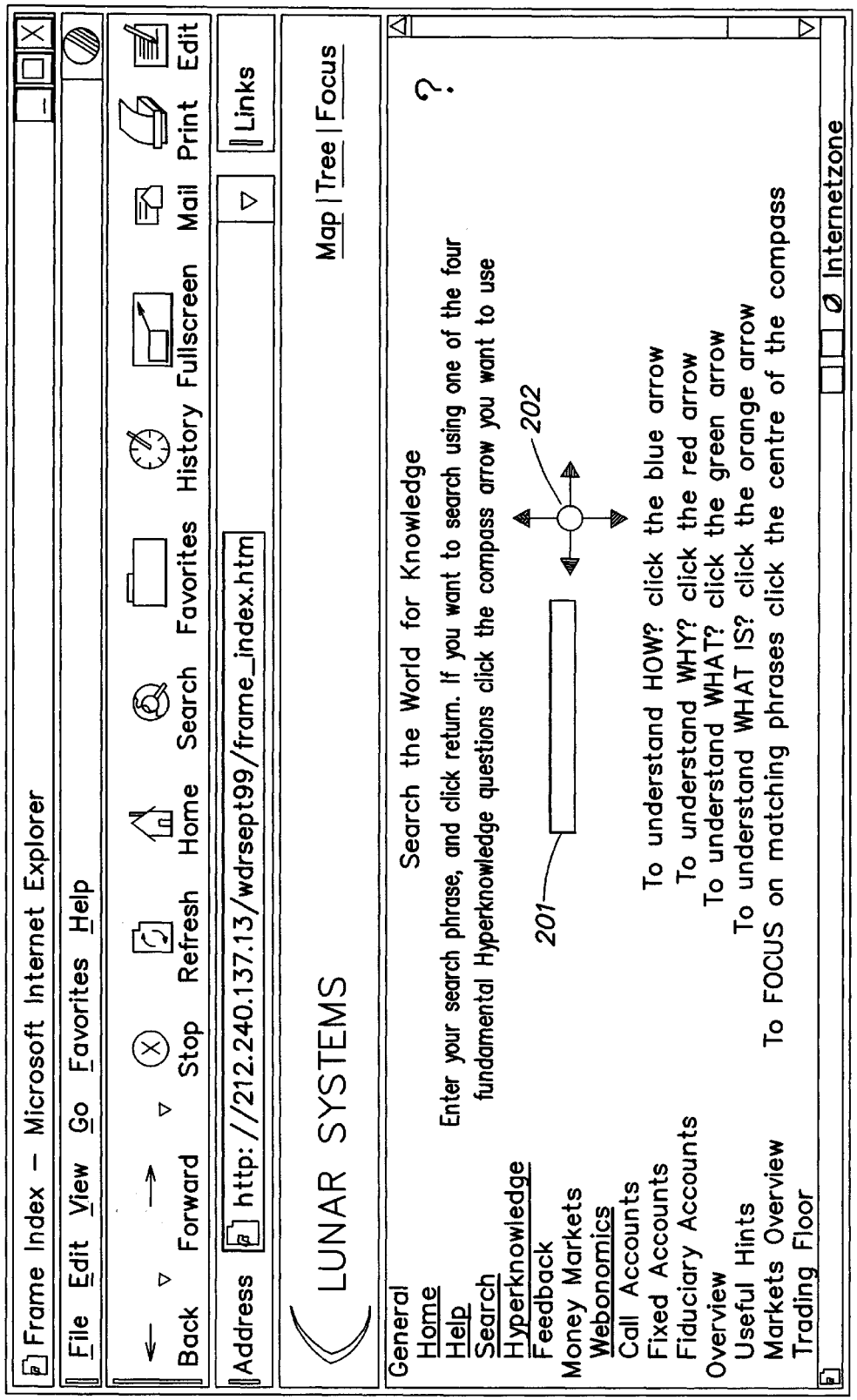
FIG. 2 is a screen shot of a user interface for searching a knowledge base.

When a user desires to retrieve knowledge, the user enters a search phrase into a search box 201, as shown in FIG. 2, for example. The user then selects the desired knowledge direction, for example by selecting using a conventional pointing device such as a mouse, one of the compass points in a compass rose 202 representation of the four knowledge directions.

If the search is executed on a linked knowledge model, the operation is simple. Processes or noun/verb phrases matching the search phrase are retrieved using a fuzzy match algorithm. The linked knowledge model is then navigated, i.e., the selected concept is changed, one step in the requested direction, and the resulting processes or noun/verb phrases are returned. Thus, a search for "employ staff" in the "Why" direction will return knowledge explaining why staff should be employed, as opposed to general information on employing staff, how to go about employing staff or what staff should be employed. If a "What" or "What is" direction is requested, then noun phrases in that direction are returned, together with a selection list of verbs related to the noun phrases returned, also extracted from the linked knowledge model. If a general search is desired, the user can elect to specify no direction, however, information overload is likely to result when a large linked knowledge model is involved.

Figure 3:
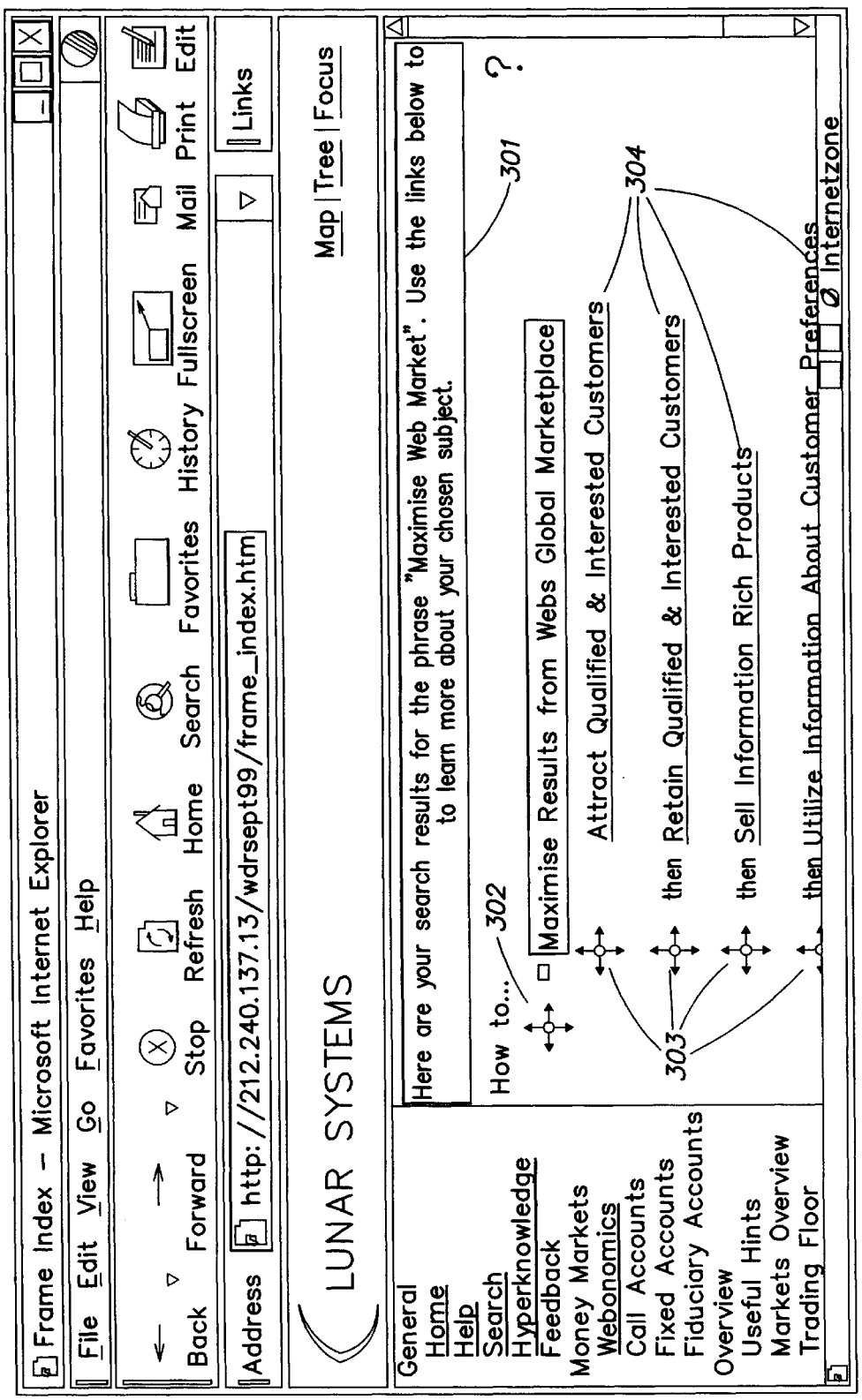
FIG. 3 is a screen shot of a user interface presenting search results in a navigable format.

Another example search is shown in FIG. 3. Here, the user has entered the search phrase 301 "maximize web market." The user has asked the question "How do I maximize my web market?" by clicking on the "How" arrow 302 of the compass rose. The search results are narrowly focussed on "How to maximize web market." To further refine an area of knowledge explored, the user can click on the desired search direction of a compass rose 303 adjacent the topic of interest 304.

If the search is executed on a generalized information source, such as the collection of hypertext documents commonly known as the World Wide Web, stored on the international computer network commonly known as the Internet, for example, then a connection to a conventional search engine is first established. The search engine is passed a query, which comprises the requested direction appended to the search phrase. For example, if searching for "employ staff" in the "Why" direction, the query passed to the search engine will be "why employ staff". By adding the direction to the query, pages answering the "why" question are promoted to the top of the search results. Once highly relevant pages have been retrieved, they can be analyzed and the knowledge contained therein extracted and displayed added to a linked knowledge mode selected or maintained by the user. This process of automatic knowledge extraction is now described in further detail.

Knowledge Extraction from Natural Language Information

It has been estimated that eighty percent of the information stored by a typical business entity is in the form of text-based documents, such as paper documents, emails, presentations and web pages. However, the knowledge represented by all of that information is unstructured and inefficiently stored, in the form of natural language. Embodiments of the invention address this problem by automatically building linked knowledge models from the natural language information using a Knowledge Research Agent (see FIG. 4, 402). When connected to appropriate input devices and conversion apparatus, spoken words, written textual documents, email messages and Web pages are converted into linked knowledge models, which are more easily searched using directional searching.

Figure 4:
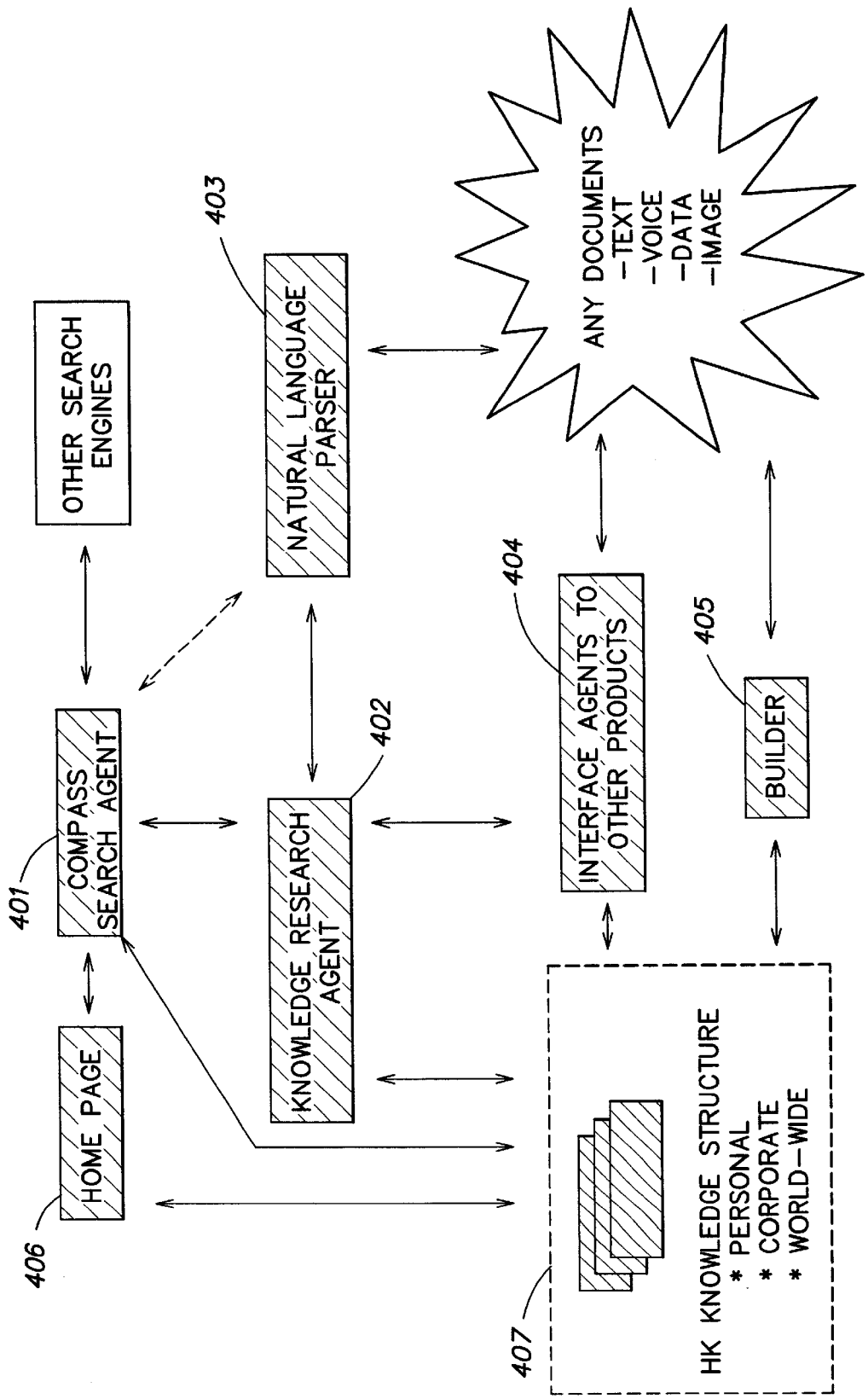
FIG. 4 is a block diagram of a system in which an embodiment of the invention is incorporated.
Figure 5:
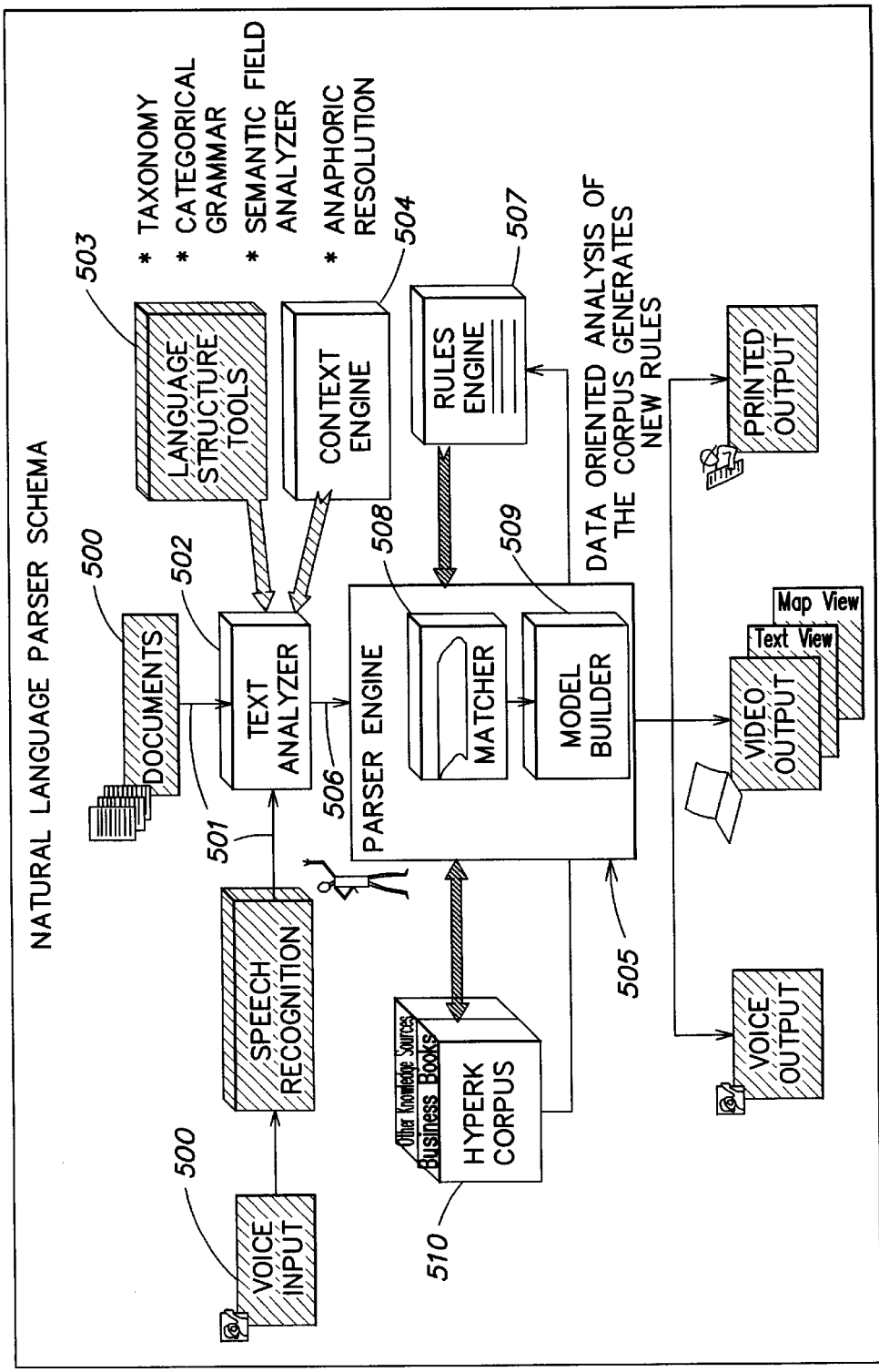
FIG. 5 is a block diagram of a Natural Language Parser embodying aspects of the invention.

A Natural Language Parser (see FIG. 4, 403), as shown in FIG. 5, and described in greater detail below, analyzes input information and structures the information in a linked knowledge model. In summary, a Text Analyzer analyses natural language sentences, annotating them with linguistic and semantic tags. A Context Engine ensures that cross-sentence relationships are tracked, allowing information from one sentence to be placed in proper context relative to information from other sentences. A Parser Engine then creates noun/verb phrase pairs and the links between them, by first annotating the noun/verb phrase pairs created as described below in connection with the Text Analyzer and then comparing the annotated noun/verb phrase pairs with a linked knowledge model corpus (KMC). Optionally, the Parser Engine also relies on rules supplied and applied by a Rules Engine.

The KMC consists of a large number of linked knowledge models, built manually from a range of texts and other knowledge sources. There may be many types of corpora, each focussing on a specific domain of knowledge, such as the knowledge contained within popular business books. The structure of these corpora is described below. The user may select a particular corpus if the input text matches the corpus' subject. Each noun/verb phrase pair in the KMC is tagged with a selection of annotations, specifically selected to enable patterns between the text and corresponding noun/verb phrase pair to be detected. These annotations can be regarded as belonging to various levels of knowledge and are described now.

The lowest level annotations are pure linguistic analysis of the text. These include part of speech (e.g. using is a verb, customer is a noun) and word frequencies compared to Standard English, possibly extracted from the British National Corpus (to highlight where a word or phrase appears more often than would be expected). Optionally included are base word forms (e.g. customers to customer, using to use) and syntactic structures (commonly known as the "parse tree" of a sentence). All these annotations can be automatically added to the KMC using existing tools such as Link Grammar and WordNet.

The middle level annotations are at the semantic level. Here, each word or multi-word phrase in both the text and noun/verb phrase pairs is tagged with their semantic field. This allows the meaning of text or noun/verb phrase pairs to be compared with other text or noun/verb phrase pairs, rather than just comparing the words themselves. This level of annotation can also be automatically created within the KMC, using a lookup resource such as Longman's Dictionary of Contemporary English.

The highest level of annotation is the noun/verb phrase pairs themselves. Due to their structure (connected to other noun/verb phrase pairs via What, How, Why and What-is links) and content (verb phrases and noun phrases) they constitute the most semantically rich data in the KMC. Because of this, and to ensure accuracy, the noun/verb phrase pairs and its related natural language text are manually co-referenced.

To facilitate pattern matching within the KMC, the noun/verb phrase pairs need to be represented in a textual markup form that describes the structure of a linked knowledge model. One possible implementation is a format based on SGML (Standard General Markup Language) which we call the Hyperknowledge Mark-up Language (HKML), although other representations could be employed. The HKML structure contains any number of tags, some of which are defined below. Each tag is used to describe a unique part of a linked knowledge model. The majority of tags are required to be closed by their closing counterpart - usually denoted by a forward slash '/' inside the tag. Some of the tags are described below, but others could be added to define further parts of the linked knowledge model. Also, other names or syntactic arrangements could be used, as known in the art.

<ENVIRONMENT> - defines the scope of the entire environment - closed by the </ENVIRONMENT tag.
<MODEL> - defines each model in an environment - closed by the <MODEL> tag.
<KNOWDES> - defines the noun/verb phrase pair section of the model closed by the </KNOWDES> tag.
<KNOWDE> - defines a single noun/verb phrase pair in a model - closed by the </KNOWDE> tag.
    attribute - KEY = number.
    attribute - CONNECTOR = cnAND/cnOR/cnTHEN.
    attribute - SUPERIOR = number (defines the Type noun/verb phrase pair of an Instance noun/verb phrase pair).
<OBJECTIVE> - defines a special noun/verb phrase pair. - closed by the <OBJECTIVE> tag. Used to surround the <KNOWDE> tag in the case that the noun/verb phrase pair is an objective.
<VERBPHRASE> - defines the verb phrase of a noun/verb phrase pair - closed by the optional </VERBPHRASE> tag.
    attribute - TEXT = string.
<NOUNPHRASE> - defines the noun phrase of a non/verb phrase pair - closed by the optional </NOUNPHRASE> tag.
    attribute - TEXT = string.
<RELATIONS> - defines the relations section of the model - closed by the </RELATIONS> tag.
<RELATION> - defines a relational link - closed by the optional </RELATION> tag.
    attribute - RELKEY = number.
    attribute - NEXTREL = number (defines the next relation).
<HOW> - defines the How noun/verb phrase pair of a relation - closed by the optional </HOW> tag.
    attribute - HOWKEY = number.
<WHY> - defines the Why noun/verb phrase pair of a relation - closed by the optional </WHY> tag.
    attribute - WHYKEY = number.

One or more linked knowledge models can be contained in an environment file. Hyperknowledge environment files are written in HKML, although other environments can be constructed using other markup languages. Each Hyperknowledge environment file (denoted by the <ENVIRONMENT> tag) contains an unlimited number of linked knowledge models (denoted by the <MODEL> tag). Each model contains two sections; the noun/verb phrase pair section, denoted by the <KNOWDES> tag, and the Relations noun/verb phrase pair connections, section, denoted by the <RELATIONS> tag.

The noun/verb phrase pair section contains an unlimited number of noun/verb phrase pairs, each one denoted by the <KNOWDE> tag. The <OBJECTIVE> tag can be used to surround a <KNOWDE> tag to denote that the noun/verb phrase pair is an objective of the model. Each noun/verb phrase pair contains several attributes; its unique identifier (key), its connector type and its owner noun/verb phrase pair in the case of it being a WHAT of a noun/verb phrase pair. The tags <VERBPHRASE> and <NOUNPHRASE> must be included between the opening and closing <KNOWDE> tags. These two tags define the two pieces of text that make up the noun/verb phrase pair.

The Relations section contains an unlimited number of Relations (each one denoted by the <RELATION> tag). Each <RELATION> tag defines the relationship between a pair of noun/verb phrase pairs. The <HOW> and <WHY> tags must be included between the opening and closing <RELATION> tags. These two tags define the two actual How and Why noun/verb phrase pairs involved in the Relation. Each Relation contains several attributes including its unique identifier, relKey, and the next Relation in the chain, nextRel.

Within the <KNOWDE> and <RELATION> tags, unique identifiers, i.e., keys are used to match up individual noun/verb phrase pairs to those included in Relations. This helps describe the unique connections between noun/verb phrase pairs so that the structure is unambiguous.

The Rules Engine includes syntactic and semantic rules, both manually developed and automatically created via Data Oriented Parsing of the corpus.

The final output of the Parser Engine is a linked knowledge model including noun/verb phrase pairs connected via "How-Why-What-What is" links. Various interfaces are then employed to output this structure to the user. These are described in more detail later.

Conventional parsers for obtaining machine understanding of natural language are enormously complex due to the scope of the problem to be solved. However, the Davies model structure is intrinsically based upon natural language noun/verb phrase pairs. The meaning, i.e., the actual knowledge, is held in the combination of the phrase pairs and the "How-Why-What-What is" relationships between different phrase pairs. Therefore, the task of mapping from natural language to knowledge, which can be stored, searched and retrieved using a machine is much more tractable.

The Natural Language Parser (FIG. 4, 403) shown in detail in FIG. 5 can reside on a remote or local server computer, or can reside on a client computer, such as a personal computer used by the user. Locating the parser on a server on the Internet is particularly advantageous when used for extracting knowledge from the World Wide Web. Locating the Natural Language Parser (FIG. 4, 403) on a user's client computer is particularly advantageous when used for extracting knowledge from the user's personal documents, reports, presentations, email, etc.

Automated Knowledge Research

Figure 1:
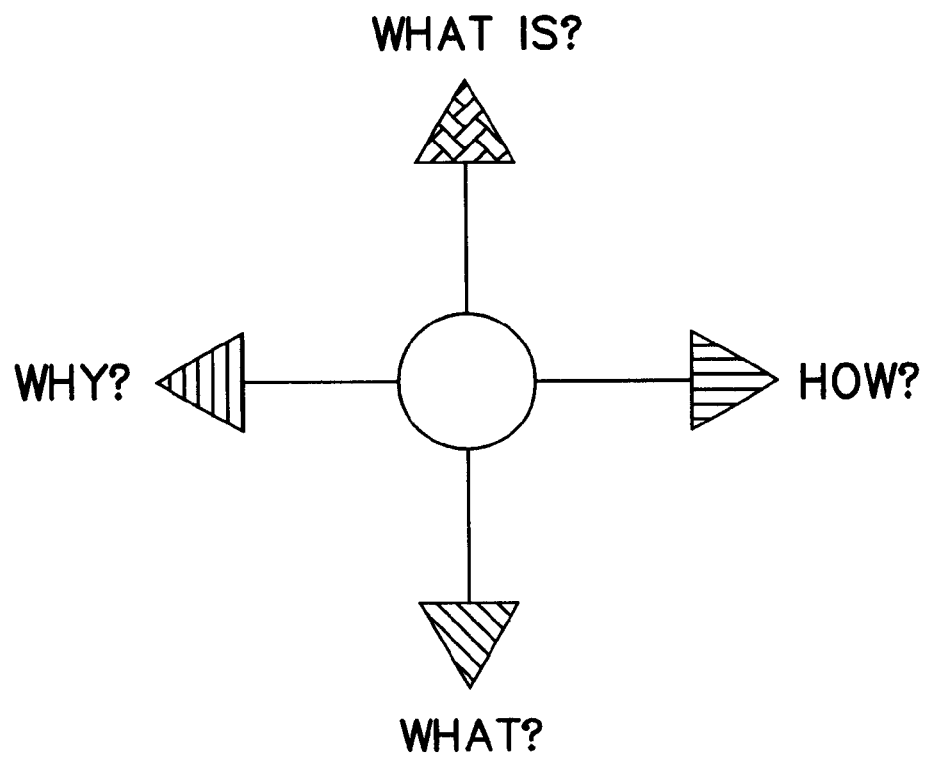
FIG. 1 is a schematic drawing of a compass rose used to indicate connection between information comprising knowledge.

Once a linked knowledge model of any size has been constructed, the very structure of the linked knowledge model illuminates the bounds of the knowledge contained therein. Processes, i.e., noun/verb phrase pairs, at the western edge (See Compass Rose of FIG. 1) of the linked knowledge model delimit the boundary of "Why" understanding and knowledge, while processes at the eastern edge (See Compass Rose of FIG. 1) of the linked knowledge model delimit the boundary of "How" understanding. Similarly, processes with few "How" or "Why" connections may represent gaps in knowledge. Likewise, processes lacking "What" or "What is" connections may represent gaps in knowledge. Any such gaps or edges can be filled in by a Knowledge Research Agent (see FIG. 4, 402) as follows.

Processes at the edges of the model or whose number of connections indicates gaps in knowledge are first identified. Then directional searching is used to find the missing information, for example on the Internet or in a user's unanalyzed documents. Knowledge is then extracted from information found in this way using the parser described above.

Once begun, automated research can proceed, essentially unattended, to continually expand machine understanding of a topic.

Interface Agents

Interface Agents (see FIG. 4, 404) facilitate the performance of the above described processes by facilitating importation of natural language information in a variety of formats. Agents have been implemented based on application programming interfaces (APIs) included in a product of Hyperknowledge Corporation of Woburn, Mass., which produces linked knowledge models according to Davies. The Hyperknowledge product used includes standard Automation, DCOM and CORBA interfaces. Other standard and custom interfaces could be implemented and used in other products.

Operation of an email Interface Agent is now considered in detail.

The interface agent detects the arrival of new email. When email arrives, the interface agent invokes the natural language extraction technology described above to extract knowledge from the email message. A model built from a single email can be useful as an aid to understanding a particularly long or complex message.

Processes extracted from the email to form the model of the email message can next be searched for in a local or other linked knowledge model accessible to the user. References to related processes and other information can then be integrated with the model of the email. Likewise, the model of the email can be integrated with the existing linked knowledge model, thus extending the knowledge and understanding contained therein. An advantage of extending the email model as described is that the user has more complete information when the email is finally read. An advantage of extending the local linked knowledge model as described is that users of that local linked knowledge model have more complete information when the local linked knowledge model is consulted.

Knowledge extracted on the fly from email, as described above, can be used in a variety of creative ways. Extracted knowledge can be used to dynamically create organized structures within the email reader client software. For example, the key subject matter of the email could be used to create folders to which the email can be stored or linked. Extracted knowledge can also be used to automatically generate informative replies to emailed questions. When extracted knowledge points to a particular part of the local linked knowledge model, and the agent finds the connection has a desired level of confidence, then an automatic reply can be generated which includes the related part of the local linked knowledge model.

Consider the following simple example. An email arrives which reads simply, "How do I delete a record?" The natural language parser would recognize "delete" as a verb and "record" as a noun, producing the process consisting of the verb/noun pair "delete record". The word "how" would then trigger a search of the linked knowledge model in the "How" direction. That portion of the linked knowledge model returned could then be sent on as the reply to the original email.

Next, a more elaborate example is given.

In this example, the user has received the following email:

John,
We need to meet urgently to understand the problems we'll face when we start to deal with the worldwide economy. We must be successful with the proposed electronic commerce strategy! I look forward to any ideas you have,
David.

The user decides to have the Natural Language Parser 403 read the text, in order to (a) summarize the content, (b) markup the key points as hypertext links and (c) use the links created at step (b) to find out more.

Firstly, the email text is annotated with syntactic and semantic. This information is used to extract candidate noun/verb phrase pairs from the email text. These will include:

deal with/the worldwide economy
be successful with/the proposed electronic commerce strategy The noun/verb phrase pair Matcher then searches the KMC for noun/verb phrase pairs that are near matches, by comparing the textual, syntactic and semantic information of the candidate noun/verb phrase pairs with the annotated noun/verb phrase pairs in the KMC. Consider the following extract from the KMC:

Your site should address the global economy. The bottom line is to make your site achieve this by considering foreign languages.

The advent of the global economy provides even more opportunities to experience e-commerce success.

| # | noun/verb phrase pair | link type | link to # |
|---|---|---|---|
| 1 | Experience E-Commerce success | how | 2 |
| 2 | Address Global economy | how | 3 |
| 3 | Consider Foreign languages | how | — |

The above represents only a small section of the KMC, showing only the text and noun/verb phrase pairs manually created that represent the text.

The candidate noun/verb phrase pair "deal with worldwide economy" is found to have a good semantic and syntactic match with the KMC noun/verb phrase pair Address Global Economy. The Model Builder 405 consequently stores the "deal with worldwide economy" noun/verb phrase pair and along with it a link to the Address Global Economy noun/verb phrase pair in the KMC. This link is tagged with a percentage confidence figure, based on the level of match between the candidate noun/verb phrase pair's annotations with the KMC noun/verb phrase pair's annotations. Along with this, all the annotations are stored with the noun/verb phrase pairs, including links back to the original email text. This association allows a hyperlink to be displayed in the email text.

Next, the HOWs and WHYs, of the Address Global Economy KMC noun/verb phrase pair are examined, and compared against other candidate noun/verb phrase pairs extracted from the email text. A good match as found also between the candidate noun/verb phrase pair "be successful with the proposed electronic commerce strategy" and the KMC noun/verb phrase pair Experience E-Commerce Success. Once again, the Model Builder 405 stores this connection and the percentage match. Also, this candidate noun/verb phrase pair is connected as a WHY of the "deal with worldwide economy" candidate noun/verb phrase pair by the Model Builder 405.

Let us suppose that no further significant matches are found against the KMC. We have then the original email text marked with two hyperlinks, representing the two noun/verb phrase pairs created by the Model Builder 405. When the user moves a compass rose pointing device over the hyperlink, the user will see that "Deal with the worldwide economy" has a WHY that is within the document, indicated by a red, west-pointing arrow. Clicking this will take the user to the text "be successful with the proposed electronic commerce strategy". But importantly, the user will also see that the KMC has suggestions on how this can be done, indicated by the hollow blue east-pointing arrow. Following this link will display a list of HOW noun/verb phrase pairs taken from the KMC, which will include Consider Foreign languages. The system has not only added structure to the document, but it has also provided links to related knowledge.

Of course, other colors, geometric shapes, etc. can be used as indicators in this context.

The Natural Language Parser

The Natural Language Parser 403 is now described in greater detail with reference to FIG. 5. The Natural Language Parser 403 includes several sub-components. Various types of input 500 are all converted to text 501, ready for analysis by the Text Analyzer 502. Once analyzed, noun/verb phrase pairs can be extracted from the text as candidates for inclusion in the final model. The Text Analyzer tags the text with the same annotations used in the KMC. These are described in detail below. Language Structure Tools 503 are used to create these annotations, including, but not limited to, Link Grammar, WordNet and Longman's Dictionary of Contemporary English. Optionally, the Text Analyzer then summarizes the supplied text using techniques such as, but not limited to, Shannon's Information Theory.

The Context Engine 504 is used to ensure that cross-sentence relationships are tracked, allowing information from one sentence to be place in proper context relative to information from other sentences. Resources such as Anaphoric Resolution Tools assist in this process. Unfortunately, sentences are not always self-contained units of knowledge on which the Parser Engine 505 can independently operate. For example, consider the sentence, "Click it to start the music." The referent of the pronoun it cannot be determined without examining a previous sentence. Supposing the previous sentence to be, "You will notice a button labeled Play," context now makes clear that it refers to the button labeled Play. The Context Engine 504 builds noun associations that are refined over plural sentences, thus allowing resolution of cross-sentence context references.

Finally, the Text Analyzer 502 builds candidate noun/verb phrase pairs from the text, using the annotations previously built. For example, the Parts of Speech analysis will indicate the presence and location of verbs and nouns, which can be used to produce noun/verb phrase pairs. An "importance" value can be assigned to noun/verb phrase pairs at this point, using results of the summary analysis (if applied) and the word-frequency annotation. If a word or phrase appears more often than would be expected, the importance of the noun/verb phrase pair it creates is increased.

The Parser Engine 505 receives the annotated text and linked candidate noun/verb phrase pairs 506 from the Text Analyzer 502. It then utilizes the Rules Engine 501 and Hyperknowledge Corpus 508 to produce the final linked noun/verb phrase pair structure. Before describing the constituents of the Parser Engine 505, the Rules Engine 507 will be described.

The Rules Engine 507 contains a list of rules that facilitate faster analysis of natural language text, leading to quicker and more accurate output of corresponding noun/verb phrase pairs. Such rules can be manually discovered, and the KMC used to develop, test and refine those invented rules. A potential rule can quickly be applied to the KMC and the number of cases where the rule works, and where there are exceptions, discovered. If the number of exceptions is low, the rule can then be accepted and further refined to deal with those exceptions.

In parallel with this, applying Data Oriented analysis techniques such as Hidden Markov Models, the Natural Language Parser 403 can begin to automatically extract patterns and rules contained within the KMC.

The Parser Engine

The first task of the Parser Engine 505 is to take the candidate noun/verb phrase pairs, in order of importance, and find matching noun/verb phrase pairs in the KMC. Matches are found by a Matcher 508 comparing the annotations of a candidate noun/verb phrase pair with the noun/verb phrase pairs and their annotations inside the KMC. Matching patterns of linguistic and semantic data in the KMC indicate a matching noun/verb phrase pair. The noun/verb phrase pair that best matches, i.e., matches most of the annotations, is selected, and is passed into the Model Builder 509.

Noun/verb phrase pairs in the KMC connected to this noun/verb phrase pair are then analyzed semantically, and the candidate noun/verb phrase pairs are searched for matches. If found, new noun/verb phrase pairs are created, replacing the words of the KMC noun/verb phrase pair with the words of the supplied text, whilst retaining the same semantic content. This process is iteratively repeated until a significant proportion of the supplied text is covered, and linked to noun/verb phrase pairs.

Optionally, the Rules Engine 507 is employed to assist with finding matching noun/verb phrase pairs in the KMC, or to suggest new noun/verb phrase pairs and connections. For example, consider the sentence, "He put the food in the fridge because he wanted to freeze the food." Here, two candidate noun/verb phrase pairs, identified by the Text Analyzer are "Put food in Fridge" and "Freeze food". The presence of the because conjunction indicates that there is a likelihood that these noun/verb phrase pairs should be connected by a WHY connection. This can further be confirmed by the presence of semantically matching examples in the KMC.

The Model Builder 509 accepts noun/verb phrase pairs from the Noun/verb phrase pair Matcher 508 and constructs a model consisting of connected noun/verb phrase pairs. Some of the noun/verb phrase pairs will match with text supplied to the parser engine, and links between these items are maintained. Other noun/verb phrase pairs will exist only in the KMC, along with a probability of the accuracy and relevance of the noun/verb phrase pair. These noun/verb phrase pairs are stored as links from the noun/verb phrase pairs in the built model to noun/verb phrase pairs in the KMC. It is then clear to see which noun/verb phrase pairs represent the structure of the supplied natural language text, and which noun/verb phrase pairs extend the knowledge not contained in the text, but already known about in the KMC.

Viewing the output structures

Figure 6:
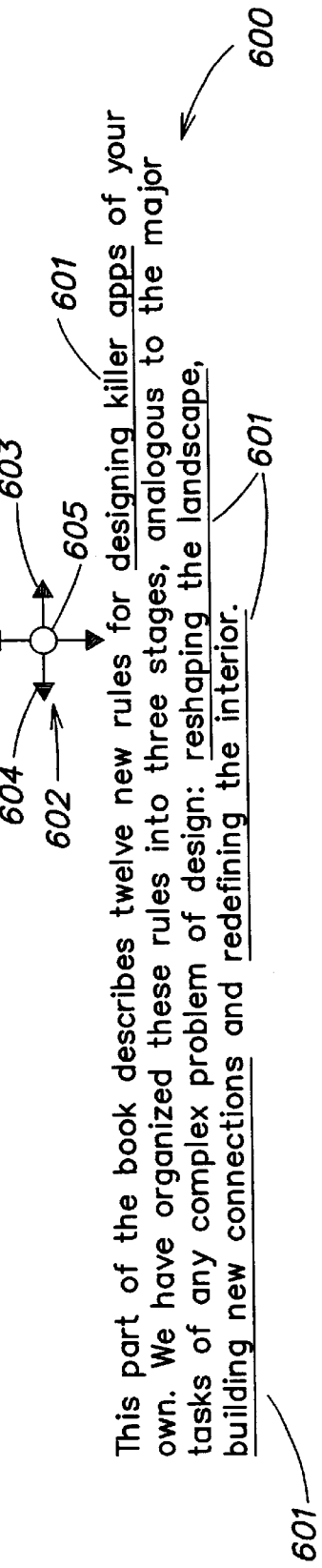
FIG. 6 is a portion of a screen shot showing a user interface for indicating relationships between information in input text comprising knowledge.

FIG. 6 demonstrates a sample output of parsed natural language text. Text 600 in which noun/verb phrase pairs have been identified is displayed with underlined hyperlinks 601 for each noun/verb phrase pair. Floating the cursor over a hyperlink presents the user with a compass 602, which is used to navigate the text according the What/How/Why/What-is structure created by the Model Builder. This structure is further described below. In FIG. 6, the hyperlink 601 "designing killer apps" can be navigated in the HOW direction by clicking the blue east-pointing arrow 603. The destination will be another part of the text within the document. This hyperlink 601 also corresponds to a noun/verb phrase pair in the KMC that has WHY noun/very phrase pairs which is not mentioned in the supplied text. This is indicated by the hollow red west-pointing arrow 604. Following this link will take the user to a page listing the WHY noun/verb phrase pairs of the "Design Killer App" noun/verb phrase pair and further knowledge navigation can occur.

Figure 7:
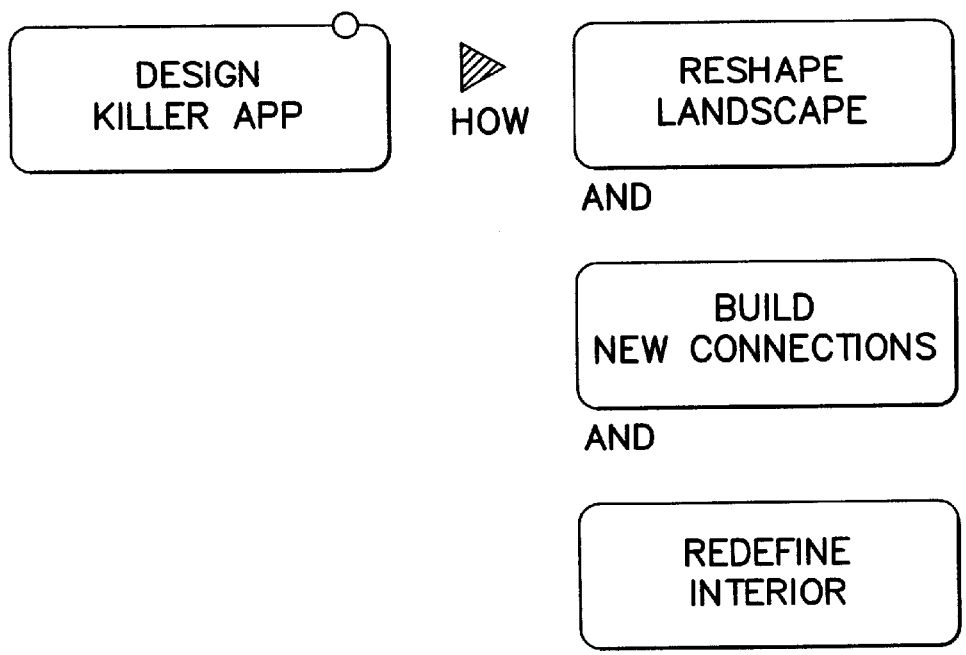
FIG. 7 is a knowledge diagram relating information in a structure representing knowledge.

By clicking the center of the compass 605, the user is taken to a Map View of the text, as displayed in FIG. 7. This view displays a "site map" of the natural language text, allowing a user to quickly and efficiently absorb and navigate the text.

Putting it all Together

The complete system, as shown in FIG. 4, is now discussed. A user enters the system through a home page 406. The home page 406 may be implemented as a hypertext page on the World Wide Web, as a presentation using proprietary software or otherwise, as would be known to those skilled in this art. The home page presents the user with options for browsing a linked knowledge model 407 directly or for searching the model 407 using directional searching, as described above. Browsing the linked knowledge model 407 directly has been described in Davies.

If directional searching is invoked by a user, the parameters of the user's query are passed to a Compass Search Agent 401 which operates as described above in the section Directional Search Capability. The Compass Search Agent 401 therefore connects to a local linked knowledge model 406 and other search engines 407, as desired, to implement any desired level of functionality.

A Knowledge Research Agent 402 can also be connected to the Compass Search Agent 401, for example to operate in the background. Depending on the results of searches performed by the Compass Search Agent 401, the Knowledge Research Agent 402 can continually increase the knowledge available in the linked knowledge model. Moreover, the Knowledge Research Agent 402 can be connected to receive inputs from a Natural Language Parser 403 which in turn receives inputs from new documents and information sources, including the queries made and results returned by the Compass Search Agent 401.

In order to accommodate a variety of input types, Interface Agents 404 to other products and a Builder 405 may also be provided. Interface Agents 404 to other products have been explained above, for example in connection with researching answers to email queries. The Builder 405 is a conventional product for manually constructing linked knowledge models 407, and has been described in Davies and mentioned above.

The Underlying Data Structure

The underlying data structure is substantially the same as that described in Davies. In general, three types of association are supported:

LEVEL ONE KNOWLEDGE - Relationships between things (noun phrases) but with no knowledge direction. For example, a relationship between CUSTOMER and ORDER.

LEVEL TWO KNOWLEDGE - Relationships between things (noun phrases) but with a knowledge direction (WHY, HOW). For example, CUSTOMER -WHY?- CASH LEVEL THREE KNOWLEDGE - Relationships between processes defining WHY-HOW. For example, Bill Customer -WHY?- Collect Cash. This is the current level at which Hyperknowledge stores knowledge.

The output from the Natural Language Parser can be stored by a variety of mechanisms. One appropriate mechanism is a relational database, but alternative storage mechanisms could be employed. The output is similar in its structure to that of the KMC and it represents the links between the output linked knowledge model and the original Natural Language Parser input text.

However, the structure also includes associations between candidate noun/verb phrase pairs created by the Model Builder and noun/verb phrase pairs in the KMC. Against each association, the percentage of accuracy of the match is stored.

The Knowledge Model Corpus Structure

The KMC structure is implemented as a large relational database. This relational database consists of many relational tables, each holding information concerning individual annotations in the corpus. However, the KMC structure is not limited to that described below as more relational tables could be added to cope with new annotation types.

The highest-level relational table lists all the noun/verb phrase pairs. Each noun/verb phrase pair has a unique key.

This identifies an individual noun/verb phrase pair and allows it to be cross-referenced against entries in other relational tables. An example of a small part of this relational table is show below. The numbers in each field are the foreign keys of the other relational tables.

| Noun/verb phrase pair Key | Verb Phrase | Noun Phrase | How Link | Why Link | ... |
|---|---|---|---|---|---|
| 1 | 1 | 1 | 4 | 3 | |
| 2 | 2 | 2 | 2 | 4 | |
| . | | | | | |
| . | | | | | |
| . | | | | | |

Each noun/verb phrase pair is broken down into a noun phrase and a verb phrase. This results in two further relational tables, each one storing the structure of the respective phrase. To bre ak down the phrases further, two more relational tables hold the individual verb phrase words and noun phrase words. The individual words in these tables are linked to other relational tables, which include those storing parts-of-speech, semantic mark-up, baseform, wordfrequency, syntactic structure and more types. Also stored against each entry in the individual word tables is the position of that word in the original corpus text.

The original corpus text is listed, word-by-word, in a single relational table. Each word in this table is again linked to the other relational tables storing the different annotation types referred to in the previous paragraph.

Further relational tables include those storing connections between noun/verb phrase pairs, and those storing connections between words. Each noun/verb phrase pair stored in the main relational table has a link to a relational table storing how connections and also to a relational table storing why connections. Each of these relational tables stores uniquely identified connections and their respective how and why noun/verb phrase pairs. A relational table storing the syntactic structure of the text is also defined. This stores the types of links between individual words. i.e., subject or object links. An example of the noun/verb phrase pair connection table for how connections is shown below.

| Relation Key | How noun/verb phrase pair | Why noun/verb phrase pair | Next-How Relation | Next-Why Relation |
|---|---|---|---|---|
| 4 | 2 | 1 | 5 | 8 |

It can be noticed in the above table that Relation 4 defines the connection between the two noun/verb phrase pairs listed in the first table above.

Also, collocation is stored in a single relational table. Collocation is defined as the frequency of repetition of word patterns, i.e., two words appear next to each other a certain number of times within the corpus.

The present invention has now been described in connection with a number of specific embodiments thereof. However, numerous modifications, which are contemplated as falling within the scope of the present invention, should now be apparent to those skilled in the art. Therefore, it is intended that the scope of the present invention be limited only by the scope of the claims appended hereto.

What is claimed is:

1. A computer-implemented system for storing and retrieving knowledge, comprising:
   a processor executing a sequence of instructions, and a memory, the sequence of instructions defining:
   a text analyzer having an input which receives a signal representing information expressed as natural language and which produces at an output a signal representing annotated information;
   a parser having an input which receives the annotated information signal from the text analyzer and which produces and stores in the memory a linked knowledge model thereof; and
   a user interface presenting at least one pair of complementary relationships to an operator, through which the operator can navigate the linked knowledge model to retrieve knowledge; wherein
   the linked knowledge model includes a first node defining a first task and a second node defining a second task, each stored in the memory, the first node and the second node forward and backward linked to each other, the first task defining why the second task is performed and the second task defining how the first task is performed.

2. The system of claim 1, further comprising:
   a knowledge research agent having an input receiving the linked knowledge model and having an output on which the knowledge research agent produces a query compatible with an external search engine.

3. The system of claim 2, wherein the hyperknowledge agent automatically augments the linked knowledge model with new information found by executing the query on the external search engine.

4. The system of claim 1, the parser further comprising:
   a rules engine executing a plurality of rules defining a structure of knowledge embedded in information expressed in natural language.

5. The system of claim 4, the linked knowledge model including connected noun/verb phrase pairs, and wherein the plurality of rules define how sentences in natural language relate to connected noun/verb phrase pairs in the linked knowledge model.

6. The system of claim 5, wherein the rules include at least one semantic rule.

7. The system of claim 5, wherein the rules include at least one syntactic rule.

8. The system of claim 5, wherein the rules include at least one context rule.

9. A computer-implemented method for retrieving knowledge from a computer memory, comprising:
   presenting on a computer display to an operator a selector by which the operator indicates one of a pair of complementary relationships and a query input by which the operator indicates query text; and
   combining the one of the pair of complementary relationships indicated and the query text to form a query signal by which knowledge is retrieved from the computer memory having the knowledge stored therein.

10. The method of claim 9, wherein the selector defines four directions characterized by complementary pairs of directions, each direction representing a relationship.

11. The method of claim 10, wherein the selector is presented in a graphical form resembling a compass rose.

12. The method of claim 9, further comprising:
   storing knowledge in a linked knowledge model including noun/verb phrase pairs;
   searching the linked knowledge model for a first noun/verb phrase pair defined by the query text; and
   retrieving a second noun/verb phrase pair from the linked knowledge model bearing the indicated one of the pair of complementary relationships to the first noun/verb phrase pair.

13. The method of claim 12, wherein searching further comprises:
parsing a natural language query text into a searchable boolean expression.

14. A method for storing knowledge, comprising:
parsing a natural language document into a linked knowledge model including connected noun/verb phrase pairs;
identifying portions of the linked knowledge model in which a level of knowledge represented is lower relative to other portions of the linked knowledge model; and
executing searches of external information for additional knowledge related to the identified portions of the linked knowledge model.

15. The method of claim 14, wherein the identified portions of the linked knowledge model include a first noun/verb phrase pair lacking a second noun/verb phrase pair related by at least one of two complementary relationships defined between noun/verb phrase pairs.

16. A software product including a machine readable medium on which is encoded a sequence of software instructions which when executed direct performance of a method comprising:
storing in a computer memory a linked knowledge model;
presenting on a computer-controlled display, to an operator, a selector by which the operator, indicates one of a pair of complementary relationships and a query input by which the operator indicates query text;
combining the one of the pair of complementary relationships indicated and the query text to form a query by which knowledge is retrieved from the linked knowledge model stored in the computer memory, and
displaying the retrieved knowledge on the computer-controlled display.

17. The software product of claim 16, wherein the selector defines four directions characterized by complementary pairs of directions, each direction representing a relationship.

18. The software product of claim 16, wherein the selector is presented in a graphical form resembling a compass rose.

19. The software product of claim 16, further comprising:
storing nodes of the linked knowledge model as noun/verb phrase pairs;
searching the linked knowledge model for a first noun/verb phrase pair defined by the query text; and
retrieving a second noun/verb phrase pair from the linked knowledge model bearing the indicated one of the pair of complementary relationships to the first noun/verb phrase pair.

20. The software product of claim 16, wherein searching further comprises:
parsing a natural language query text into a searchable boolean expression.

21. A software product including a machine readable medium on which is encoded a sequence of software instructions which when executed direct performance of a method comprising:
receiving a signal representing a natural language document,
parsing the natural language document into a linked knowledge model including connected noun/verb phrase pairs;
storing the linked knowledge model in a computer memory;
identifying, by comparing numbers of links, portions of the linked knowledge model in which a degree of knowledge represented is lesser relative to other portions of the linked knowledge model; and
executing computer-implemented searches of external computer memories in which are stored additional information for additional knowledge related to the identified portions of the linked knowledge model.

22. The software product of claim 21, wherein the identified portions of the linked knowledge model include a first noun/verb phrase pair lacking a second noun/verb phrase pair related by at least one of two complementary relationships defined between noun/verb phrase pairs.

* * * * *

UNITED STATES PATENT AND TRADEMARK OFFICE
CERTIFICATE OF CORRECTION

PATENT NO. : 6,823,325 B1
DATED : November 23, 2004
INVENTOR(S) : Trevor B. Davies et al.

It is certified that error appears in the above-identified patent and that said Letters Patent is hereby corrected as shown below:

Column 2,
Line 50, delete "is".

Column 4,
Line 41, "mode" should read -- model --.
Line 45, "storcd" should read -- stored --.

Column 6,
Line 18, "non/verb" should read -- noun/verb --.

Column 13,
Line 20, "bre ak" should read -- break --.
Lines 24-25, "baseform, wordfrequency" should read -- base form, word frequency --.

Column 15,
Line 28, "operator, indicates" should read -- operator indicates --.

Signed and Sealed this

Eighth Day of February, 2005

JON W. DUDAS
*Director of the United States Patent and Trademark Office*